United States Patent
Schmidt et al.

(10) Patent No.: US 7,838,057 B2
(45) Date of Patent: Nov. 23, 2010

(54) PROTEIN-CONTAINING FOOD PRODUCT AND METHOD OF PREPARING SAME

(75) Inventors: Siegfried Schmidt, Verden-eitze (DE); Marinus Pannevis, Verden (DE)

(73) Assignee: Mars Incorporated, McLean, VA (US)

( * ) Notice: Subject to any disclaimer, the term of this patent is extended or adjusted under 35 U.S.C. 154(b) by 1564 days.

(21) Appl. No.: 10/508,594

(22) PCT Filed: Mar. 24, 2003

(86) PCT No.: PCT/EP03/03018

§ 371 (c)(1),
(2), (4) Date: Apr. 22, 2005

(87) PCT Pub. No.: WO03/079808

PCT Pub. Date: Oct. 2, 2003

(65) Prior Publication Data

US 2005/0214420 A1     Sep. 29, 2005

(30) Foreign Application Priority Data

Mar. 25, 2002   (DE)   ................. 102 13 280

(51) Int. Cl.
*A01J 1/10* (2006.01)
(52) U.S. Cl. ...................... 426/512; 426/656
(58) Field of Classification Search .......... 426/512, 426/656
See application file for complete search history.

(56) References Cited

U.S. PATENT DOCUMENTS 4,276,319 A    6/1981  Nguyen et al.

FOREIGN PATENT DOCUMENTS

| | | | |
|---|---|---|---|
| EP | 0241441 | | 10/1987 |
| EP | 0 710 670 | * | 5/1996 |
| EP | 0710670 | | 5/1998 |
| EP | 0 862863 | * | 9/1998 |
| EP | 0862863 | | 9/1998 |
| JP | 53005072 | * | 1/1978 |
| JP | 59006165 | | 2/1984 |
| JP | 03210168 | | 9/1991 |
| WO | WO-9841390 | | 9/1998 |
| WO | WO-0205652 | | 1/2002 |
| WO | WO-03009710 | | 2/2003 |

OTHER PUBLICATIONS

BE-884264. Abstract.*

* cited by examiner

*Primary Examiner*—Keith D Hendricks
*Assistant Examiner*—Hamid R Badr
(74) *Attorney, Agent, or Firm*—Fulbright & Jaworski, LLP

(57) ABSTRACT

A method of manufacturing a protein-containing food product by means of heat-treating a protein and water-containing carrier material suitable for pumping in a turboreactor which has a cylindrical reaction chamber with a rotor equipped with blades in order to centrifuge the carrier material in the form of a dynamic, turbulent layer against an inner wall of said reaction chamber, heat-treating, drying to AW less than 0.6 and granulating the carrier material, advancing the carrier material in the direction of an outlet from the turboreactor, and forming individual food products from the carrier material; a protein-containing food product made by press molding of a carrier material that has been granulated and dried to an AW value of less than 0.6 and that is microbiologically stable, the carrier material being free of gelantized starch.

31 Claims, 5 Drawing Sheets

PROTEIN-CONTAINING FOOD PRODUCT AND METHOD OF PREPARING SAME

CROSS-REFERENCE TO RELATED APPLICATIONS

This Application is a National Stage of application PCT/EP03/03018 filed on Mar. 24, 2003.

TECHNICAL FIELD

The invention relates to a protein-containing food product and a method of preparing same wherein a matrix comprising a protein-containing carrier material is provided with a probiotic substance as an additive, of the kind that is known from EP 0 862 863, for example.

BACKGROUND OF THE INVENTION

The known method or food product provides for the carrier material to form a matrix of gelatinized starch and to be coated or filled with a probiotic material.

BRIEF SUMMARY OF THE INVENTION

The object of the present invention is to provide a new method of manufacturing a protein-containing food product and a novel food product in which one is no longer dependent on gelatinized starch as the matrix for the carrier material.

In a first aspect, this object is achieved in accordance with the invention by a method of manufacturing a protein-containing food product comprising the following steps:

delivering a protein and water-containing carrier material suitable for pumping, to a turboreactor which has a cylindrical reaction chamber with a substantially horizontal longitudinal axis and with a rotor equipped with blades and rotatable about its longitudinal axis provided in the reaction chamber, rotating the rotor at a speed sufficient to centrifuge the carrier material against an inner wall of said reaction chamber and to form a dynamic, turbulent layer at the inner wall, heat-treating the carrier material in the reaction chamber by heating the inner wall to a predetermined temperature, drying the carrier material to a water content corresponding to an $A_w$ (water activity) value of 0.6 or less, so that the carrier material is microbiologically stable, and granulating the carrier material, advancing the carrier material in the direction of an outlet from the turboreactor and withdrawing the heat-treated carrier material from the outlet, forming individual food products from the carrier material.

After the drying step, the carrier material preferably has a granulate, pourable, not readily clotting consistency that can easily be metered and from which, e.g. by pressing, individual food products in any shape can be formed. Particle size of the granulated carrier material can be less then 3 mm and in particular less than 2 mm.

Before and/or after the forming step, a prebiotic substance and/or probiotic micro-organisms may be added to the carrier material.

The heat-treated carrier material may be mixed with the prebiotic substance and/or the probiotic micro-organisms before forming. Alternatively or in addition, the heat-treated carrier material may be sprayed or coated with a prebiotic substance and/or with probiotic micro-organisms after forming.

The probiotic micro-organisms can be added or layered on in an encapsulated form.

It is preferable for the carrier material to be manufactured from meat (beef, pork, poultry, or any other origin), fish and/or protein produced biologically or by micro-organisms. In order to ensure that the carrier material is suitable for pumping, fibers or particles present in the carrier material may be comminuted to a size necessary for this purpose, especially to a length of less than 5 mm, preferably less than 3 mm and further preferably less than 2 mm.

It is appropriate for the inner wall of the turboreactor to be heated to a temperature in the range from 50° C. to 150° C., and the inner wall of the turboreactor may also be heated in sections to different temperatures, such as with temperatures rising or falling in a longitudinal direction. As a result of the heat treatment, the carrier material is micro-biologically stabilized. In addition, the carrier material may be treated enzymatically, e.g. pre-digested, before the heat treatment.

The heat treatment of the carrier material can be carried out at a temperature between 70° C. and 120° C., preferably between 80° C. and 100° C. and even more preferably at about 90° C. The heat treatment of the carrier material can be carried out for an average dwell time of 1 to 10 minutes, preferably 2 to 5 minutes and even more preferably about 3 minutes. The rotor may be rotated at a speed between 200 and 2,000 revolutions per minute, preferably between 300 and 1,500 revolutions per minute and even more preferably between 500 and 1,000 revolutions per minute. The method may preferably be carried out continuously, i.e. with a constant quantity of carrier material suitable for pumping being introduced into the turboreactor and an equally large quantity being withdrawn from the outlet. The turbulent layer referred to may be a fluid layer or a layer formed from soft, plastic particles.

During the heat treatment of the carrier material, a gas, especially a drier gas such as air, may be passed through the reaction chamber. Irrespective of whether a drier gas is used or not, the carrier material may be dried to a total water content of less than 50%, especially less than 40%. Furthermore, the carrier material may be further dried after leaving the turboreactor in a further (drying) turboreactor. The carrier material can be dried to a total water content of less than 20%, especially less than 10%. The dried carrier material may have an $A_w$ value of less than 0.15, in particular when probiotics are added.

The invention further provides for the heat-treated and optionally dried carrier material to be cooled.

In a further embodiment of the invention, the (heat-treated optionally dried and cooled) carrier material may be additionally mixed with a binder which is preferably free of gelatinized starch and in particular is free of starch.

It is further envisaged that minerals, vitamins and/or trace elements may be added to the (heat-treated) carrier material. In addition, chunky additives may be mixed with the heat-treated carrier material, especially dried vegetables, cereals, vegetable fibers, extruded and optionally expanded additives or granulated additives. In this context, the invention provides in particular for the density, texture and/or taste of the food product to be adjusted by means of the additive.

In addition, fat may be added to the heat-treated carrier material.

In a further embodiment, the invention provides for the food products to be formed by compacting, pressing or press molding. The food products can be formed with cavities which are filled with a prebiotic substance and/or probiotic micro-organisms. It can be provided for the food products to be co-extruded with the substances or micro-organisms mentioned, and these substances can be blended in a suitable carrier substance which facilitates co-extrusion.

In a second aspect, the object of the invention can be achieved by a protein-containing food product made by press moulding of a carrier material that has been granulated and dried to an $A_w$ value less than 0.6 and that is microbiologically stable, the carrier material being free of gelatinized starch. The food product may comprise a prebiotic substance and/or probiotic micro-organisms. In this case, an $A_w$ value of 0.15 or less of the carrier material is preferred.

It is preferable for the prebiotic substance and/or the probiotic micro-organisms to be blended with the carrier material. Alternatively or in addition, the carrier material may be sprayed or coated with the prebiotic substance and/or the probiotic micro-organisms. In addition, the food product may have at least one cavity filled with a prebiotic substance and/or probiotic micro-organisms. The probiotic micro-organisms may be encapsulated, e.g. in a matrix of sugar, fat or polysaccharide.

The invention preferably provides for the carrier material to comprise meat, fish and/or protein produced by microorganisms. It is appropriate for the carrier material to have a fibre length of less than 5 mm, preferably less than 3 mm and more preferably less than 2 mm. Preferably, the food product is made from a carrier material that is not only granulated, but pourable as well, where particle sizes may be less than 3 mm and preferably less than 2 mm.

The carrier material may contain a binder that is free of gelatinized starch and in particular is free of starch.

In a preferred further embodiment of the invention, the food product, especially when mixed with the carrier material, may contain minerals, vitamins, trace elements and/or fat.

The food product may further contain chunky additives, particularly when these are mixed into the carrier material, and especially dried vegetables, cereals, vegetable fibers, extruded and optionally expanded additives or granulated additives. The additives may preferably have a density of less than 0.7 and especially less than 0.5.

The food product may have an $A_w$ value of less than 0.6 and, if containing microorganisms, less than 0.15 to ensure good vitality and life.

BRIEF DESCRIPTION OF THE DRAWINGS

The invention will now be described with reference to a number of embodiments, reference being made to a drawing in which.

DETAILED DESCRIPTION OF THE INVENTION

Figure 1:
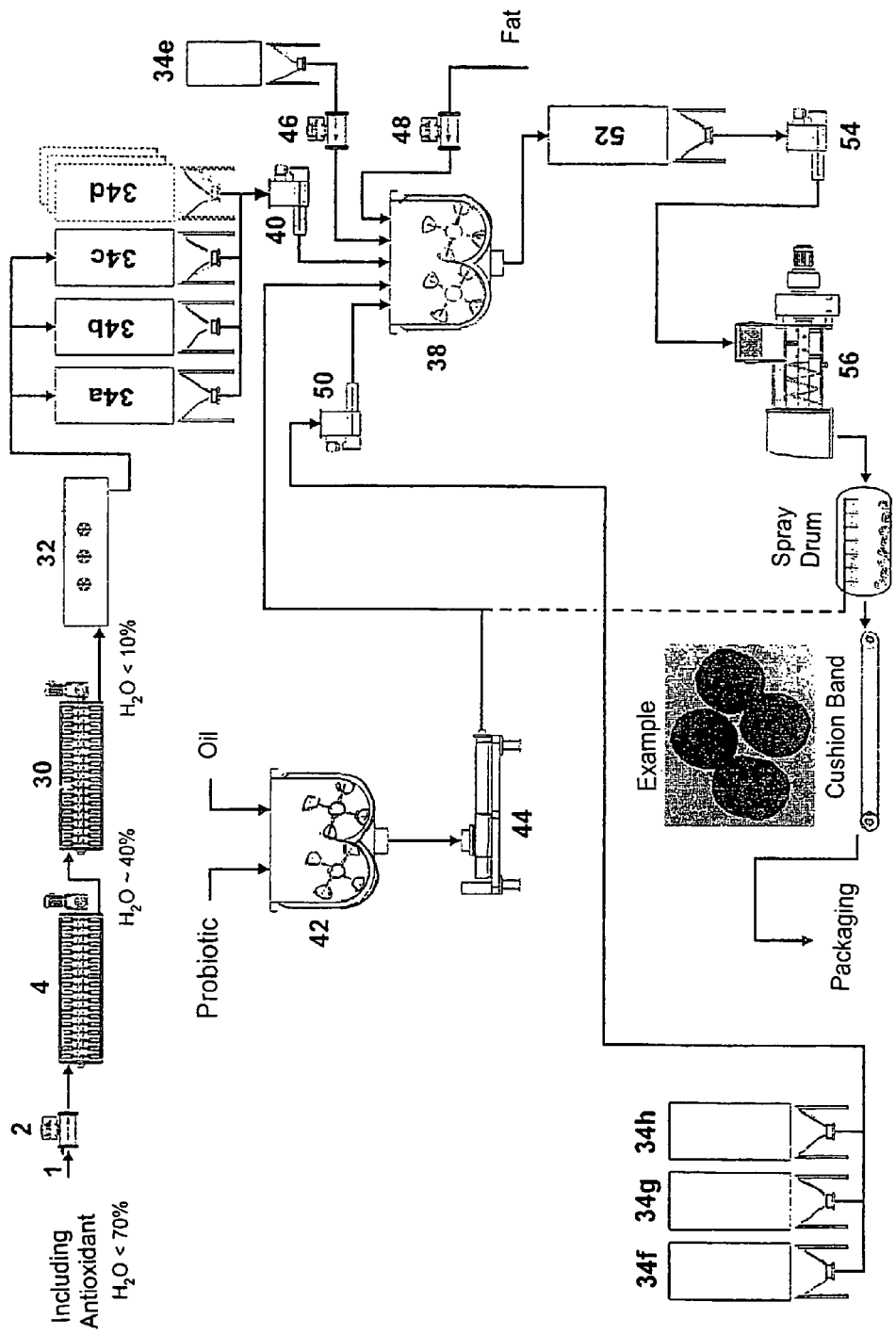
FIG. 1 is a schematic diagram to illustrate the method of the invention according to a first embodiment.

FIG. 1 shows a schematic diagram of a process according to the invention in the form of a flow chart, indicating the device components used. At the starting point of the manufacturing process, a carrier material 1 suitable for pumping is produced, which consists virtually exclusively of protein, water and optionally fat. The protein portion of the carrier material 1 can consist of meat, fish, other animal protein or also of protein produced by bacteria or micro-organisms. The proportion of water in the carrier material (total water content, free and bound water) is less than 70% as a rule. The carrier material may contain antioxidants in addition.

Meat as such can be used as a carrier material, i.e. without prior pressing off of fat, which is usual and necessary in other drying methods. By use of meat as such, it is possible to obtain dried meat out of the turboreactor (described below), and not just a meat product having a reduced fat content or otherwise changed composition (apart from water content).

Advanced by a pump (not shown), the carrier material 1 passes through a metering station (throughput measuring unit) 2 into a turboreactor 4 of the type known from U.S. Pat. No. 3,527,606, for example, the structure and functioning of which is explained below in connection with FIG. 5. In the turboreactor 4, the carrier material is centrifuged against the inner wall of the turboreactor and forms a thin, highly dynamic, turbulent fluid layer, whose dwell time in the turboreactor is adjusted to about 3 minutes at about 90° C. Pasteurisation or essential reduction of germs takes place in the turboreactor at the same time as drying. The heat-treated carrier material has a total water content of about 40% at the outlet from the turboreactor 4.

Figure 5:
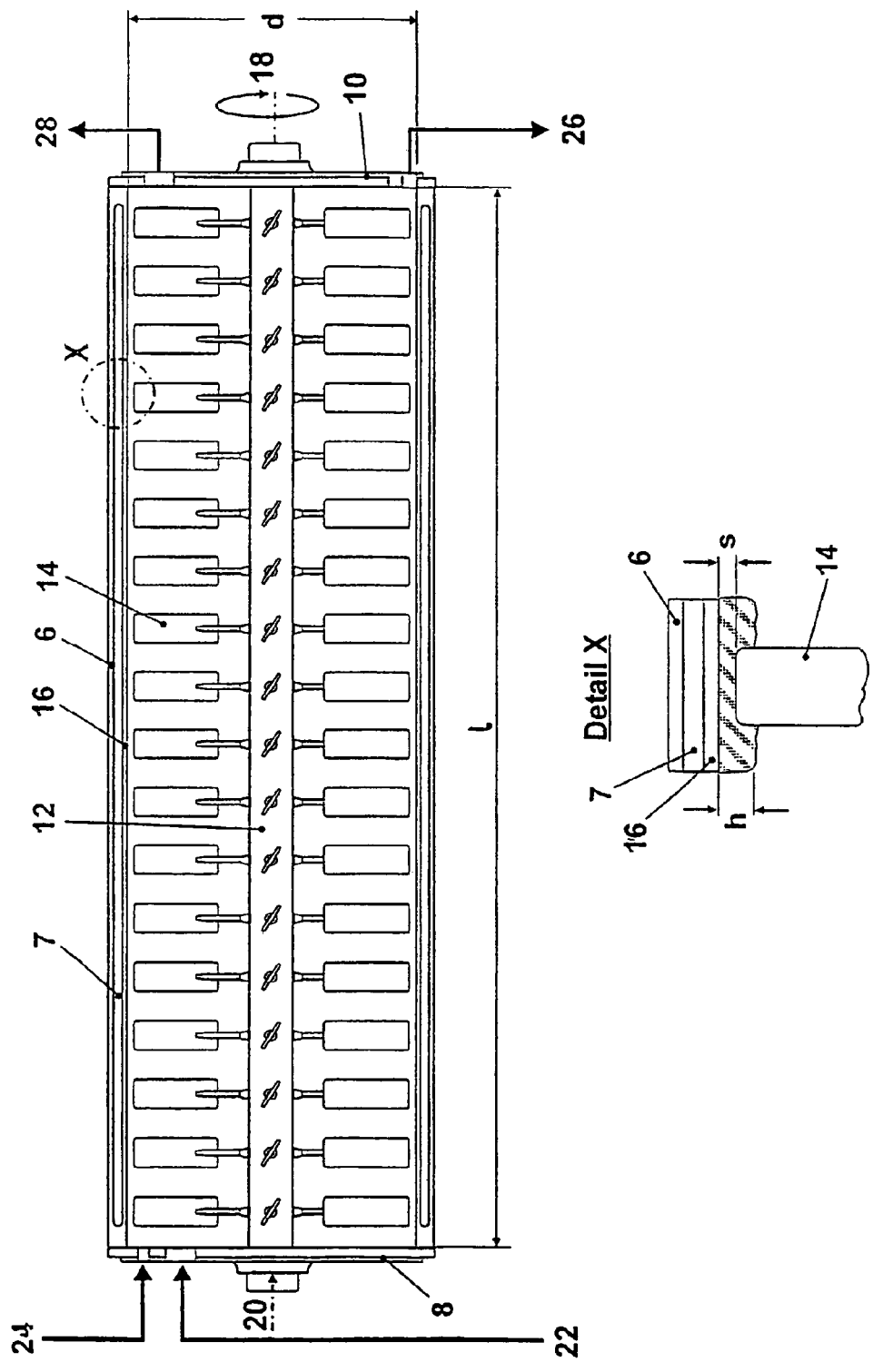
FIG. 5 is a longitudinal section of a known turboreactor of the kind used in the method of the invention.

In order to explain the turboreactor 4, reference should first be made to FIG. 5. The turboreactor essentially consists of a cylindrical, double-walled housing 6, which forms a heating or cooling jacket 7. Inside the housing 6 a rotor 12 is rotatably mounted on end walls 8, 10, said rotor 12 having a plurality of blades 14 which are disposed to project radially from the rotor 12. The blades end at a radial distance s, e.g. 5 mm, from an inner wall 16 of the housing 6 and are adjusted, taking into account the direction of rotation (arrow 18) of the rotor, such that they generate a conveying effect in a predetermined direction, in the direction of the end wall 10 in the present case.

The double casing 7 of the housing 6 can be subdivided in an axial direction (longitudinal axis 20) into a number of chambers separated from one another in order to make different levels of heating or cooling possible from one section to the next.

The turboreactor 4 is normally arranged such that its longitudinal axis 20 is horizontal, though it may also be arranged on a slight incline in order to support the flow of material within the turboreactor by the effect of gravity.

A product delivery point 22 and a gas delivery point 24 are provided in the (first) end wall 8, while a product removal point 26 and a gas removal point 28 are disposed in the (second) end wall 10.

With a length 1 of about 3 m and an internal diameter d of about 35 cm, the turboreactor 4 can be operated at a speed of 750 revolutions per minute, for example. The turboreactor can be fed continuously with a flow of material of, for example, 80 kg/h carrier material, with the temperature of the double casing of the housing being maintained at 125° C. in order to achieve a product temperature of about 90° C. Since the turboreactor is operated at ambient pressure, the product is heated at most during short periods to temperatures near or above 100° C., due to its water content and the cooling effect by evaporation/vaporisation.

Because of the high speed of rotation, the carrier material is centrifuged against the inner wall 16 in a highly dynamic, turbulent layer with an average thickness h of a few millimetres, e.g. 10 mm, in the course of which there is an intensive transfer of heat in the turbulent layer of material from or to the inner wall 16. Via the gas delivery point 24, air, an inert gas or a gas triggering a reaction may be delivered, especially in order to remove water vapour from the turboreactor and, in this way, to contribute to drying the carrier material.

Making reference once again to FIG. 1, the heat-treated and partially dried carrier material 1 reaches a drying turboreactor 30 downstream which in principle has a structure identical to that of the turboreactor 4 and which the carrier material leaves as a substantially dried meat or protein with a total water content of less than 10%. The carrier material, which might still be sticky because of its fat content, is cooled in a cooler 32 and now has a granulate or particulate, pourable consistency, in which it is poured into storage containers 34a, 34b, 34c for the appropriate types (beef, lamb, fish . . . ) and from which it can readily be metered. Contrary to extrudated, dried material, the carrier material exiting the turboreactor is therefore not lumpy, but has a pourable, virtually ground consistency which facilitates further processing.

The total germ concentration can be reduced by treatment in the turboreactor by a factor of $10^3$, $10^4$ and even $10^5$ and more, e.g. from $10^8$ germs/g at the metering station to $10^3$ germs/g after the drying turboreactor, dependent on temperatures and degree of drying. An AW value of 0.6 or less stops any growth of microorganisms that are relevant for perishableness, so that the carrier material can be considered micro-biologically stable and non-perishable.

One or more other storage container(s) 34d contain(s) prebiotic substances, which in the present connection should be understood to mean substances that have a favourable effect on the life or growth of the probiotic micro-organisms, e.g. substances that can be absorbed or processed in some other way by the probiotic micro-organisms, so that their numbers increase and/or their vitality is improved, and also further additives such as vegetable fibers.

The granulated, pourable carrier material for one or more desired types from one or more of the storage containers 34a to d is passed via a metering station 40 to a mixer 38, where it is mixed with other substances, namely first with probiotic micro-organisms which are added in doses via a mixer 42 and a pump 44. The probiotic micro-organisms may be encapsulated in a suitable matrix and optionally premixed in the mixer 42 with the addition of oil before being added to the mixer 38.

Further additives are a binder, which is delivered from a storage container 34e via a metering station 46, this preferably being a starch-free binder. Fat may be added via a metering station 48.

From other storage containers 34f, g, h, minerals, vitamins, other trace elements and optionally further probiotic micro-organisms can be added via a metering station 50.

After being gently but thoroughly mixed in the mixer 38, the carrier material provided with all the desired additives is placed in a storage container 52, from which it is delivered via a metering station 54 to a mould press 56 which presses the material into a desired final shape, e.g. into small, compact bite-sized food pellets. It may be either a foodstuff for human consumption, or equally an animal feed, e.g. for pets or breeding animals. Fish feed may also be manufactured in this way, and in this case an increased fat content is often desired, which can be achieved by adding appropriate quantities.

Figure 2:
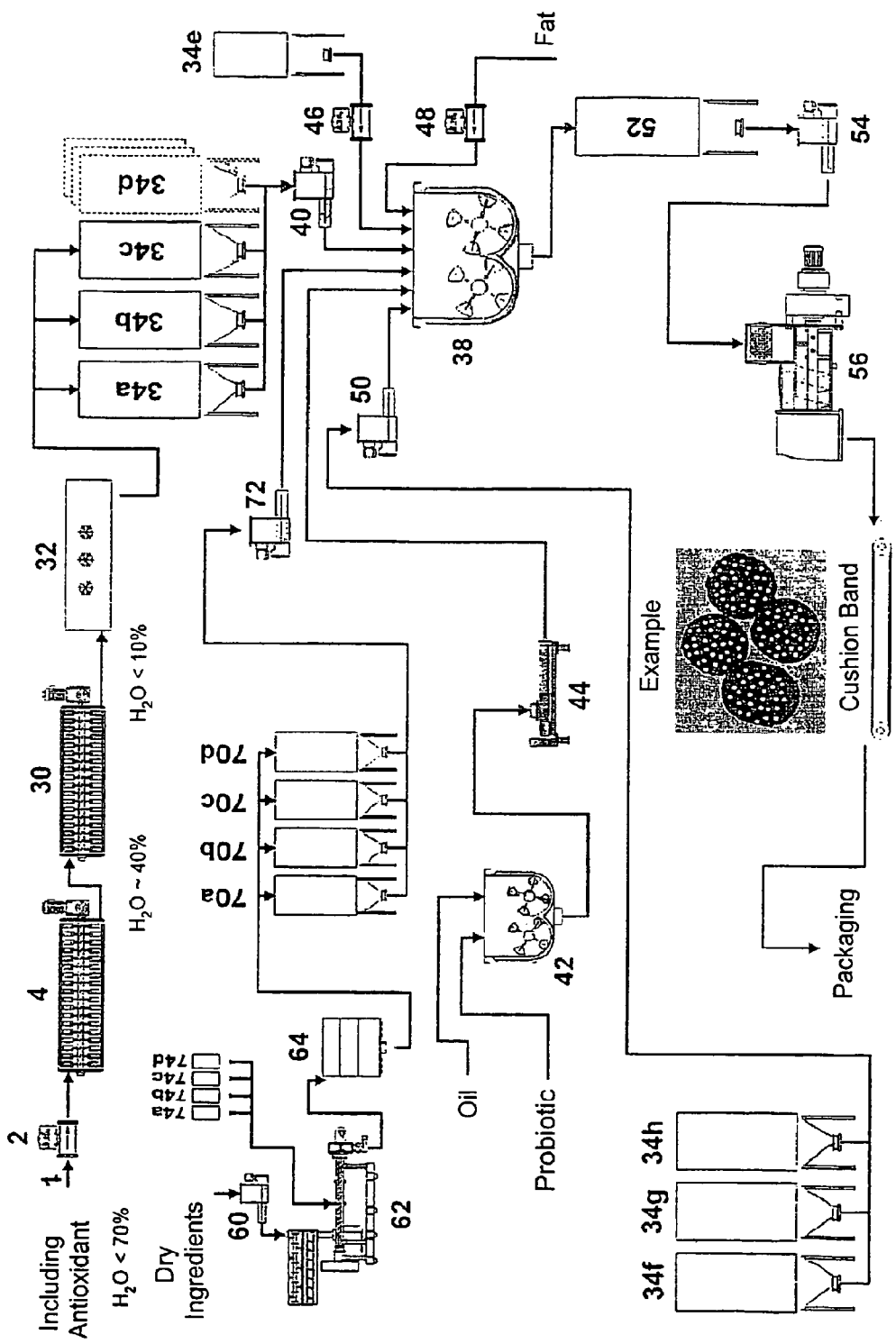
FIG. 2 is a schematic diagram to illustrate the method of the invention according to a second embodiment.

FIG. 2 illustrates a supplement to the schematic diagram of FIG. 1, where, in addition to the ingredients already referred to, chunky additives are mixed with the carrier material, namely in particular dried vegetables, cereals, vegetable fibers and other granulated additives, these in particular being extruded and expanded additives which are delivered via a metering station 60 and a dry extruder 62 after passing through a cooler 64 to further storage containers 70a, b, c and d, from which they are added via a metering station 72 to the mixture 38.

The additives may be dyed with a variety of dyes 74a, b, c, d, so that the finished product has a correspondingly multi-colored appearance.

The advantage of mixing in the additives mentioned is that it is possible to adjust the texture and taste and, moreover, if expanded additives are used, the density of the finished food product.

Figure 3:
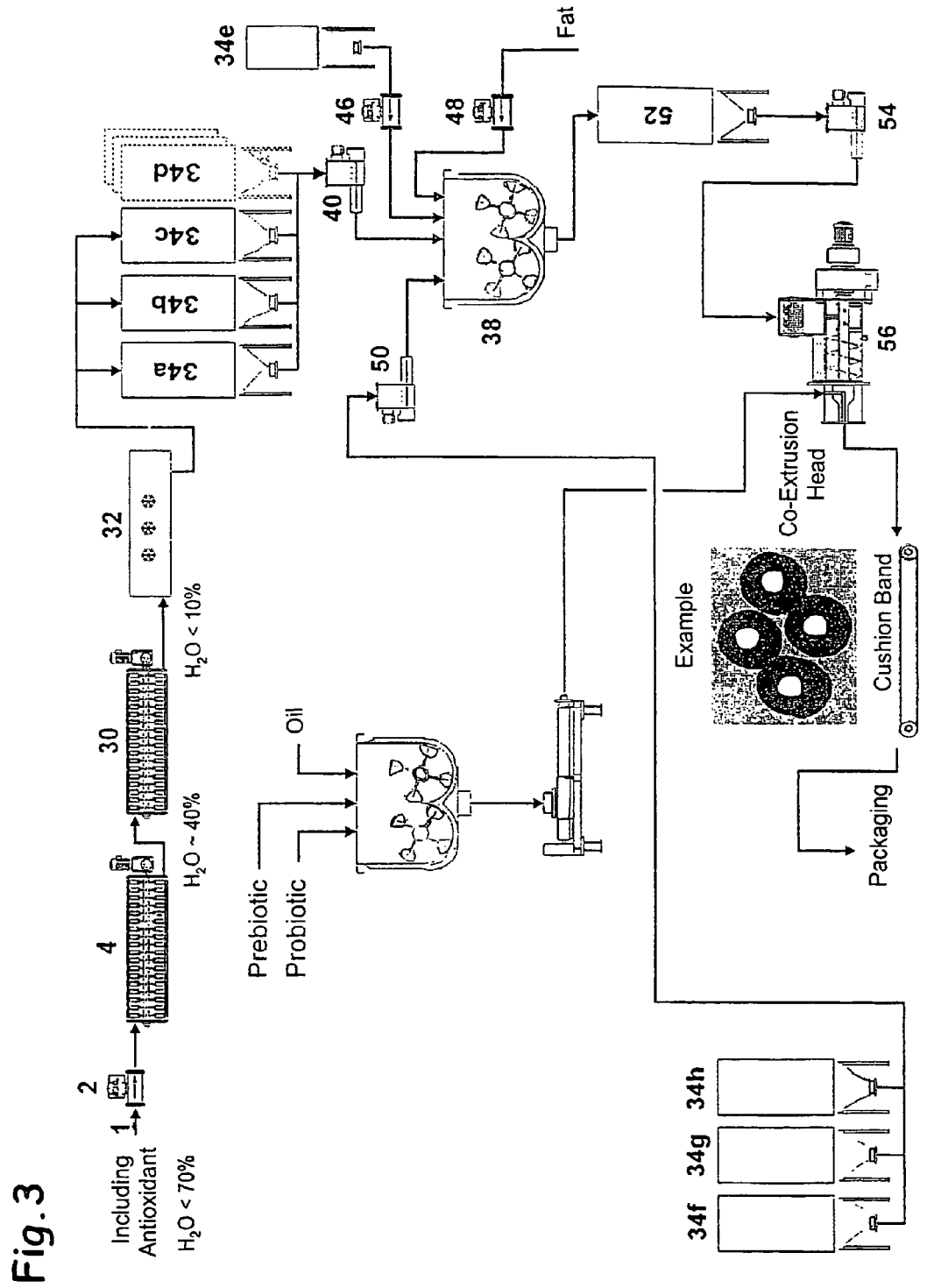
FIG. 3 is a schematic diagram to illustrate the method of the invention according to a third embodiment.

FIG. 3 shows a variant of the schematic diagram of FIG. 1, where the mixture of probiotic micro-organisms, prebiotic substances and oil provided in the mixer 42 is not delivered directly to the carrier material in the mixer 38, but is co-extruded with the carrier material and is present within the finished food product unmixed, in addition to the carrier material. It goes without saying that mixed forms of the two process variants are conceivable, i.e. part of the prebiotic or probiotic substances can be added to the carrier material in the mixer 38 and another part can be co-extruded.

Figure 4:
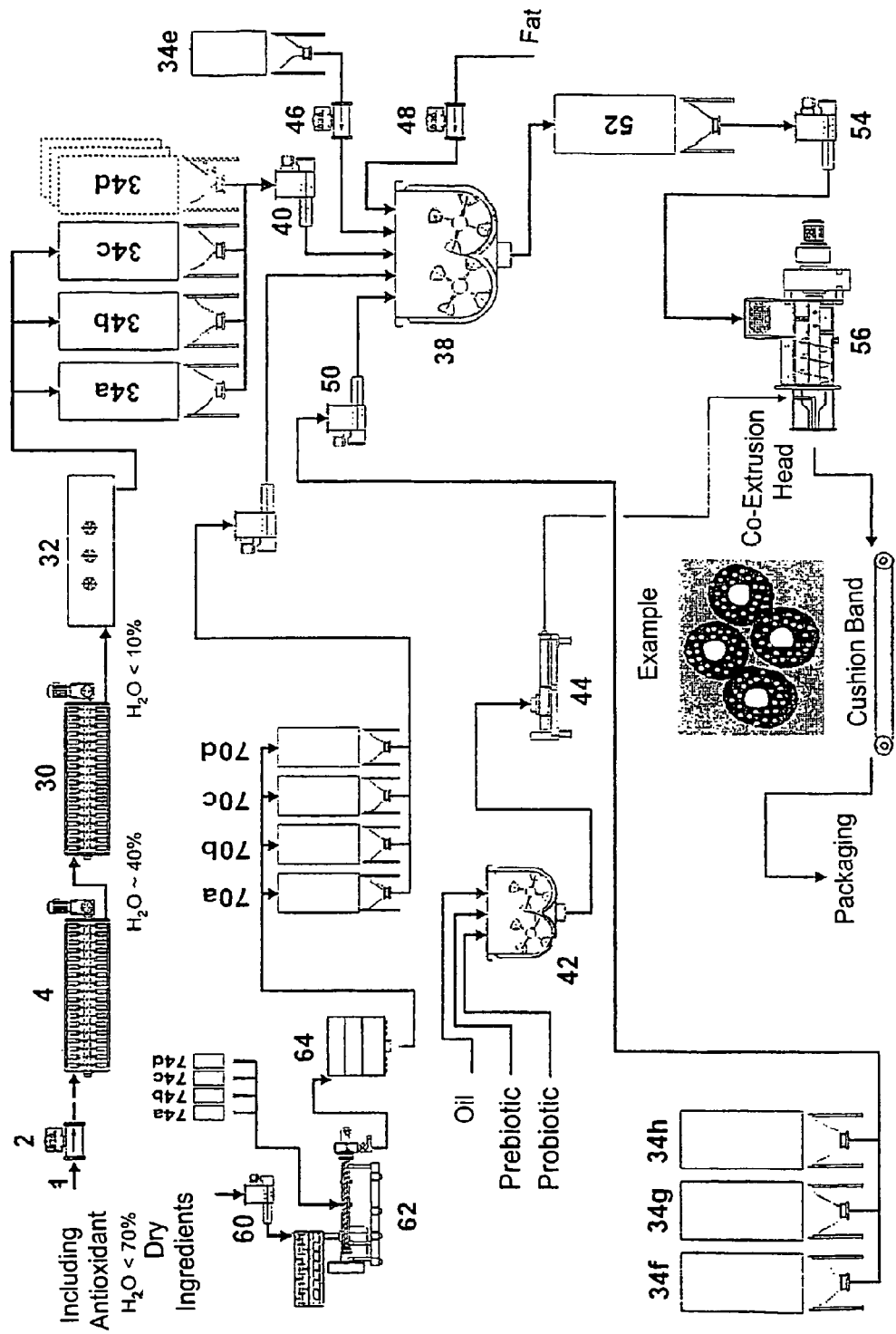
FIG. 4 is a schematic diagram to illustrate the method of the invention according to a fourth embodiment.

FIG. 4 shows a schematic diagram which corresponds substantially to a combination of FIGS. 2 and 3 and in which the optionally dyed and expanded additives are added to the carrier material, which is subsequently co-extruded with at least part of the total amount of prebiotic or probiotic substances to be added.

In each of the process variants described in accordance with FIGS. 1 to 4, it is possible, in addition or as an alternative to mixing the prebiotic or probiotic substances with the carrier material (mixer 38), for the latter to be sprayed or coated on in a suitably sprayable or coatable form at an appropriate point in the course of the process, which may be done either already in the mixer 38 or only after shaped or form-pressed food pellets have been manufactured.

With regard to the food product of the invention, it may be mentioned in addition that the latter is not restricted to the method of manufacturing by processing the protein-containing carrier material in a turboreactor, but that any suitable protein-containing carrier material being micro-biologically stabilized and dried to a sufficiently low water content or $A_w$ level, in particular meat material, could be placed into the storage containers 34a, b, c as the starting material and further processed accordingly. One major advantage in connection with manufacturing or processing the carrier material in the turboreactor is the higher product quality (nutritional value, taste, digestibility, natural vitamin content, smell, micro-biological quality, non-perishability).

What is claimed is:

1. A method of preparing a protein-containing food product comprising the steps of:
   providing a carrier material consisting of a protein source and water, the carrier material being free of gelatinized starch and suitable for pumping, wherein the protein source in the carrier material is selected from the group consisting of meat, fish and other animal protein;
   delivering the carrier material to a turboreactor which has a cylindrical reaction chamber with a substantially horizontal longitudinal axis and with a rotor equipped with blades and rotatable about its longitudinal axis provided in the reaction chamber;
   rotating the rotor at a speed sufficient to centrifuge the carrier material against an inner wall of said reaction chamber in which a high turbulence forms a dynamic, turbulent layer at the inner wall;
   heat-treating the carrier material in the reaction chamber by heating the inner wall to a predetermined temperature, drying the carrier material to a water content corresponding to an $A_w$ value of 0.6 or less, so that the carrier material is microbiologically stable, and granulating the carrier material to create a free flowing granular dried meat, fish or other animal protein carrier material;

advancing the heat treated carrier material in the direction of an outlet from the turboreactor and withdrawing the heat-treated carrier material from the outlet; and forming individual food products having a desired shape from the granular dried meat, fish or other animal protein carrier material that is free of gelatinized starch, wherein the individual food products are formed from a plurality of the heat-treated dried meat, fish or other animal protein carrier material granulates.

2. The method as claimed in claim 1, wherein before and/or after the forming of the individual food products, a prebiotic substance and/or probiotic micro-organisms is added to the heat treated dried meat, or fish or other animal protein carrier material.

3. The method as claimed in claim 2, wherein the heat-treated dried meat, fish or other animal protein carrier material is mixed with the prebiotic substance and/or the probiotic micro-organisms before forming the individual food products.

4. The method as claimed in claim 2, wherein the heat-treated dried meat, fish or other animal protein carrier material is sprayed or coated with a prebiotic substance and/or with probiotic micro-organisms before or after forming.

5. The method as claimed in claim 1, wherein any fibers or particles present in the carrier material are comminuted to a length of less than 5 mm.

6. The method as claimed in claim 1, wherein the heat treatment of the carrier material is carried out at a temperature between 70° C. and 120° C. or between 80° C. and 100° C.

7. The method as claimed in claim 1, wherein the heat treatment of the carrier material is carried out for an average dwell time of about 1 to 10 minutes or about 2 to 5 minutes.

8. The method as claimed in claim 1, wherein during the heat treatment of the carrier material, a gas is passed through the reaction chamber.

9. The method as claimed in claim 8, wherein the gas is a drier gas such as air.

10. The method as claimed in claim 9, wherein the drier gas is air.

11. The method as claimed in claim 1, wherein the dried meat, fish or other animal protein carrier material is further dried after leaving the turboreactor in a further turboreactor.

12. The method as claimed in claim 1, wherein the dried meat, fish or other animal protein carrier material has an $A_w$ value of less than 0.15.

13. The method as claimed in claim 1, wherein the carrier material is additionally mixed with a binder which is free of gelatinized starch.

14. The method as claimed in claim 1, wherein minerals, vitamins and/or trace elements are added to the carrier material.

15. The method as claimed in claim 1, wherein additives are mixed with the heat-treated dried meat, fish or other animal protein carrier material, the additives selected from the group consisting of dried vegetables, cereals, vegetable fibers, extruded additives, expanded additives and granulated additives.

16. The method as claimed in claim 1, wherein oil or fat is added to the heat-treated carrier material.

17. The method as claimed in claim 1, wherein the carrier material is additionally mixed with a binder which is free of starch.

18. The method as claimed in claim 1, wherein any fibers or particles present in the carrier material are comminuted to a length of less than 2 mm.

19. The method as claimed in claim 1, wherein the heat treatment of the carrier material is carried out at a temperature of about 90° C.

20. The method as claimed in claim 1, wherein the heat treatment of the carrier material is carried out for an average dwell time of about 3 minutes.

21. The method of claim 1, further comprising the step of: press moulding a heat-treated meat, fish or other animal protein carrier material that has been granulated and dried to an $A_w$ value of less than 0.6 and that is microbiologically stable, wherein the heat-treated dried meat, fish or other animal protein carrier material is free of gelatinized starch.

22. The method as claimed in claim 21, wherein the carrier material has a fiber length or particle size of less than 5 mm.

23. The method as claimed in claim 21, wherein the carrier material contains a binder which is free of gelatinized starch.

24. The method as claimed in claim 21, wherein the food product formed from the dried meat, fish or other protein carrier material contains minerals, vitamins, trace elements and/or fat.

25. The method as claimed in claim 21, wherein the carrier material has a fiber length or particle size of less than 2 mm.

26. The method as claimed in claim 21, wherein the food product contains additives mixed into the dried meat, fish or other animal protein carrier material.

27. The method as claimed in claim 21, further comprising adding a prebiotic substance and/or probiotic micro-organisms.

28. The method as claimed in claim 27, wherein the prebiotic substance and/or the probiotic micro-organisms are blended with the carrier material.

29. The method as claimed in claim 27, wherein the probiotic micro-organisms are encapsulated in a matrix of sugar, fat or polysaccharide.

30. The method as claimed in claim 27, wherein the dried meat, fish or other animal protein carrier material is sprayed or coated with the prebiotic substance and/or the probiotic micro-organisms.

31. The method as claimed in claim 26, wherein the additives are selected from the group consisting of dried vegetables, cereals, vegetable fibers, extruded additives, expanded additives and granulated additives.

* * * * *